United States Patent [19]
Kalen

[11] 3,798,882
[45] Mar. 26, 1974

[54] GRANULAR BED FILTER APPARATUS AND METHOD

[75] Inventor: Bodo Kalen, Dix-Hills, N.Y.

[73] Assignee: The Ducon Company, Inc., Minneola, N.Y.

[22] Filed: Sept. 28, 1971

[21] Appl. No.: 184,395

[52] U.S. Cl.............. 55/302, 55/324, 55/337, 55/423, 55/459, 55/474, 55/484, 55/518, 55/519
[51] Int. Cl............................................. B01d 46/30
[58] Field of Search......... 55/96, 98, 302, 316, 315, 55/318, 387, 484, 474, 479, 512, 513, 514, 515, 516, 517, 518, 519, 74, 77, 293, 324, 337, 423, 459

[56] References Cited
UNITED STATES PATENTS

| | | | |
|---|---|---|---|
| 2,804,168 | 8/1957 | Church | 55/302 |
| 2,951,551 | 9/1960 | West | 55/316 |
| 3,166,382 | 1/1965 | Purse et al. | 23/288 F |
| 3,410,055 | 11/1968 | Zenz | 55/96 |
| 3,410,056 | 11/1968 | Reinauer | 55/96 |

FOREIGN PATENTS OR APPLICATIONS

| | | | |
|---|---|---|---|
| 984,844 | 3/1965 | Great Britain | 55/516 |
| 45/5118 | 2/1970 | Japan | 55/96 |

Primary Examiner—Dennis E. Talbert, Jr.
Attorney, Agent, or Firm—Seidel, Gonda & Goldhammer

[57] ABSTRACT

A filter apparatus including a hollow filter stack. Each filter stack includes a series of annular filter beds which are of narrow width and receive inert granular filter material such as sand. The filter beds are backwashed by two or more repetitive high pressure jets to form a shock wave while the bed is fluidized.

12 Claims, 6 Drawing Figures

PATENTED MAR 26 1974 3,798,882

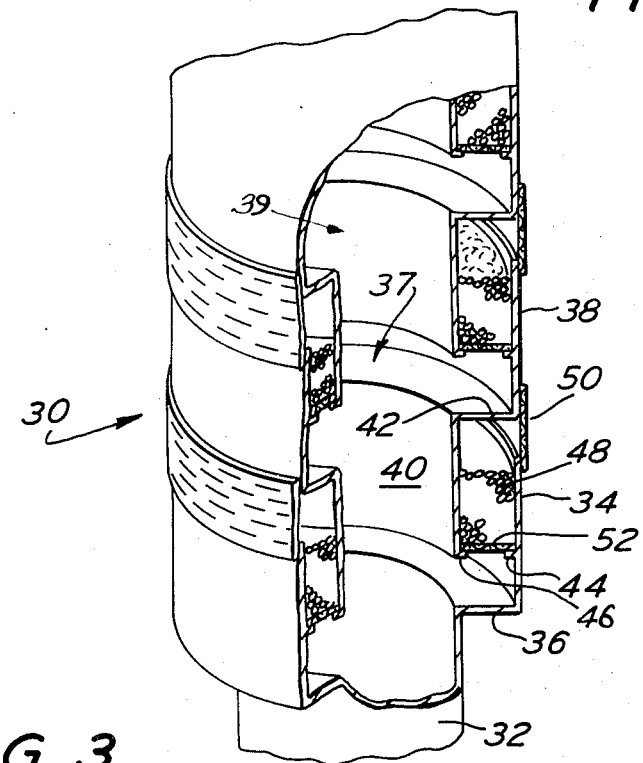
FIG. 2
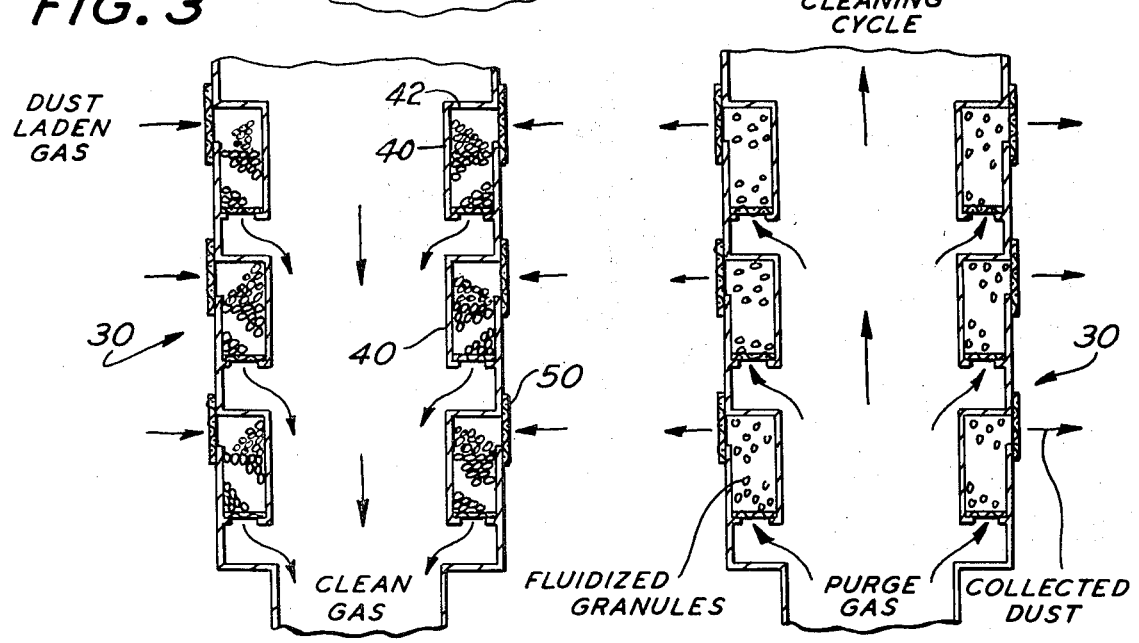
FIG. 3
FIG. 4

GRANULAR BED FILTER APPARATUS AND METHOD

The present invention is directed to a granular bed filter which represents a new approach to air pullution control. While the present invention is adapted for use in a wide variety of environments, it is particularly adapted for use in connection with high temperature flue gases which may have been precleaned by cyclones but still contain fine particles. The fine particles that remain in the flue gases must be removed if the thermal energy of the flue gases are to be reused for power recovery. If those fine particles are not removed, they tend to wear away the turbine blades or interfere with the proper operation of the blades or other power recovery equipment.

The granular bed filter apparatus of the present invention includes one or more filter stacks. Each filter stack includes a series of discrete annular members. Each annular member includes an inner wall and an outer wall interconnected by an intermediate wall. Intermediate wall may be radial or inclined with respect to the longitudinal axis of the stack.

The inner wall of one annular member cooperates with the outer wall on an adjacent annular member to define a space in which granular filter material may be supported. A screen extends across adjacent outer walls of adjacent annular members to define an inlet to the filter bed. A generally horizontal screen defines the bottom of the bed and the outlet from the bed to the interior of the filter stack.

The present invention is an improvement over the expandable bed filter in U.S. Pat. No. 3,410,055. While the filter in said patent performs satisfactorily under certain environmental conditions, I have found that more satisfactory and more efficient results are obtained under certain envoronmental conditions by the apparatus and method of the present invention. The filter beds of the present invention are of narrow width. I have found that narrow width annular filter beds produce more efficient results since the approximate angle of repose of the granular material after each backwashing in such narrw beds has little or no effect on the equal gas distribution needed for fluidizing the filter bed during backwashing. Thus, this results in a substantially constant bed height.

Each filter stack is provided with its own backwash nozzle aligned therewith. Backwashing is preferably accomplished using a post jet high pressure technique wherein air at a high pressure is introduced into the filter stack to induce the plenum air to fluidize the filter bed. The air pressure for backwashing should be in excess of 80 psi and preferably between 150 and 200 psi for a bed having approximately 4 pounds of No. ½ sand in each filter compartment. Backwashing is preferably accomplished by two jets or pulses of air timed so as to occur approximately 0.10 to 0.15 seconds delay. In this manner, the second pulse will induce a shock wave in the filter bed before the filter bed has collapsed from its fluidized state. In addition, the backwash pulses of air are at a velocity which is at least twice the velocity needed to induce incipient fluidization so as to remove and carry away the agglomerated particles which have been collected by the filter bed.

In accordance with the method of the present invention, dirty gas is introduced radially into a hollow stack by way of an inlet screen to annular filter beds of granular material. The problems associated with the angle of repose of the granular material are minimized by having filter beds of narrow width. The dirty gas is filtered by passing through the annular filter beds in an axial direction. The cleaned gas enters the stack and discharged in an axial direction therefrom.

The screens are preferably of the slotted plate type rather than of the wire mesh type. The size of the slots will vary with the type of granular material being utilized. However, the slots will always be longer than their width. I have found that a slotted plate type screen having slots longer than their width is easier to clean by backwashing as compared with wire mesh screens. This is particularly true wherein the particles carried by the dirty gas are of a sticky nature.

It is an object of the present invention to provide a novel granular bed filter apparatus and method.

It is a specific object of the present invention to provide a granular bed filter apparatus and method which is adapted for use with high temperature and dirty gases containing fine particles which must be removed therefrom.

It is another object of the present invention to provide a granular bed filter apparatus and method which is more efficiently backwashed.

It is another object of the present invention to provide a granular bed filter apparatus and method capable of handling sticky materials while having a high gas capacity and high efficiency while utilizing narrow granular filter beds capable of being more efficiently backwashed.

Other objects will appear hereinafter.

For the purpose of illustrating the invention, there is shown in the drawings a form which is presently preferred; it being understood, however, that this invention is not limited to the precise arrangements and instrumentalities shown.

FIG. 2 is a partial perspective view of a stack of filter elements broken away for purposes of illustration.

FIG. 3 is a diagrammatic illustration of the collection cycle.

FIG. 4 is a diagrammatic illustration of the backwash-cleaning cycle.

Figure 1:
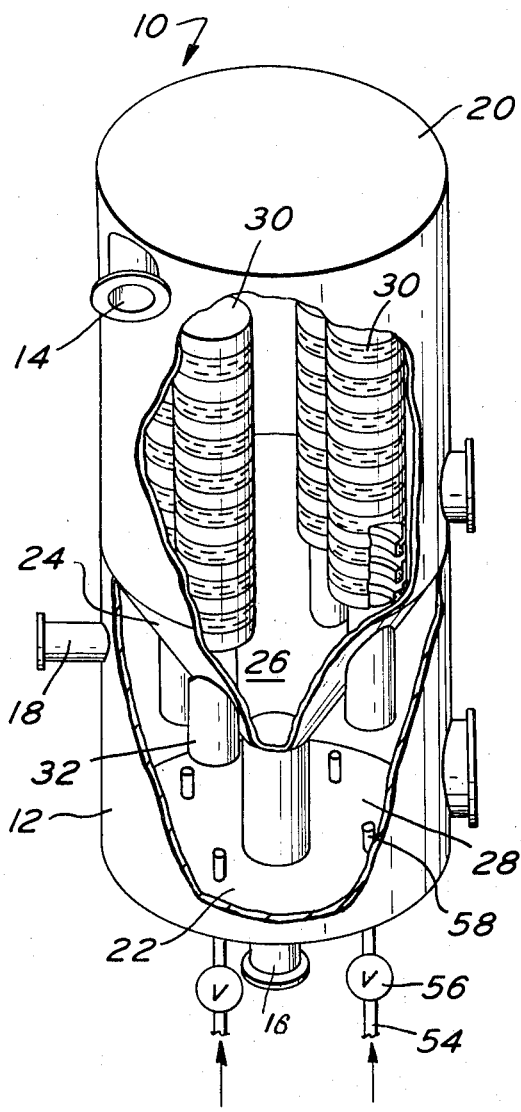
FIG. 1 is a diagrammatic illustration of filer apparatus in accordance with the present invention with portions broken away for purposes of illustration.

Referring to the drawing in detail, wherein like numerals indicate like elements, there is shown in FIG. 1 a granular bed filter apparatus in accordance with the present invention designated generally as 10. The filter apparatus 10 includes a housing designated generally as 12. While the housing 12 is indicated in the drawing as having a cylindrical configuration, other configurations may be utilized for the housing. Thus, the housing may be a combination of a cylinder and a cone or any other configuration.

The housing 12 includes a tangentially arranged dirty gas inlet 14 adjacent the top wall 20 thereof. The inlet 14 need not be tangentially arranged and may be located in any convenient position on the housing 12. Housing 12 is provided with a dust outlet 16 axially arranged within the housing 12 and extending through the bottom wall 22 thereof. Housing 12 is also provided with a clean gas outlet 18.

The interior of the housing 12 may be divided into an inlet chamber 26 and an outlet or plenum chamber 28 by means of the wall 24. Wall 24 need not be of funnel shape as shown but may be at horizontal or at other angular relationships. It will be noted that the dust outlet 16 communicates directly with the inlet chamber 26.

Within the inlet chamber 26, there is supported one or more stacks of filter elements 30. The stacks 30 may be supported from above or below. For purposes of illustration, the stacks 30 are supported by the wall 24 and extend upwardly therefrom. When a plurality of stacks is supported within the chamber 26, they are preferably circumferentially arranged and spaced from one another a suitable distance. Each stack 30 is supported from the wall 24 by means of an outlet conduit 32 which communicates the interior of the stack with the outlet chamber 28. Since each of the stacks 30 is identical, only one stack will be described in detail.

As shown more clearly in FIG. 2, the conduit 32 is connected to a cylindrical outer wall 34 by means of an intermediate horizontally disposed wall 36. Above walls 34 and 36, there are provided a plurality of superimposed annular members 37, 39, etc. Each annular member includes a cylindrical outer wall 38 connected to a cylindrical inner wall 40 by means of an intermediate wall 42. In FIG. 2, the intermediate wall 42 is radially arranged with respect to the longitudinal axis of the stack.

A radially outwardly extending flange 46 is provided at the lower end of the inner wall 40. A radially inwardly extending flange 44 is provided on each of the outer walls 34, 38, etc. The space between the inner wall 40 on one annular member and the outer wall on the next adjacent annular member defines a narrow annular chamber filled with granular material to define a filter bed. The filter bed between walls 34 and 40 is defined as 48.

A cylindrical screen 50 extends between the outer walls on adjacent annular members. Screen 50 provides an inlet to the filter bed and may be separate from or integral with wall 34. An inner screen 52 is supported by the radially extending flanges on adjacent annular members such as flanges 46 and 44. Screen 52 defines an outlet from the filter bed so that cleaned air may enter the interior of the stack and discharge axially through the conduit 32.

The screens 50 and 52 are preferably of the slotted plate type rather than being of the wire mesh type. I have found that screens of the slotted plate type are more easily cleaned during backwashing and have a longer life than small wire mesh screens which tend to oxidize more quickly in high temperature environments. Also, slot size can be independent of the plate thickness whereas this is not true of wire mesh screens. The size of the slots will vary with the size of the granular material. In a typical filter bed wherein the granular filter material is an inert sand such as No. ½ sand, the slots in the screens 50 and 52 may be 0.0138×0.140 inch in plates having a thickness of 0.0244 inch. The thickness of the plates and the size of the slots will vary under the different temperature conditions in which the filter will be used and the size of granular material being used. The transverse dimensions of the slots should always be less than the transverse dimensions of the filter material.

A backwash nozzle 58 is supported in any convenient manner aligned with each of the filter stacks. Nozzle 58 is conveniently supported by the bottom wall 22 in the illustrated embodiment and communicates with a conduit 54 having a control valve 56. Conduit 54 is preferably in communication with a source of high pressure air such as air at a pressure of 150 to 200 psi. Valve 56 is a commercially available pilot operated diaphragm valve provided with a timer so that sequential pulses of backwash air may be introduced into the outlet chamber 28.

In an operative embodiment of the present invention, satisfactory results were obtained using backwash pulses spaced from one another by 0.10 to 0.15 seconds. The high pressure air released during backwash at 180 psi had a volume of approximately 3.7 standard cubic feet for the two pulses from nozzle 58 which was connected to valve 56 having a ¾ inch opening. The high pressure backwash air induces the air flow from the plenum chamber to fluidize the filter beds. Satisfactory results have been utilized under these conditions wherein the volume of the plenum air was approximately 18 cubic feet. The pulses were timed so that the second pulse creates a shock wave received at the filter beds before the filter beds have collapsed from their fluidized state as a result of the first pulse.

As will be apparent from the drawing, the filter beds are comprised of granular material which occupies less than the total amount of the space in the filter chambers. Thus, approximately 25 percent of the space in the filter chambers above the filter beds is unoccupied so that the bed may be fluidized into that space.

Figure 5:
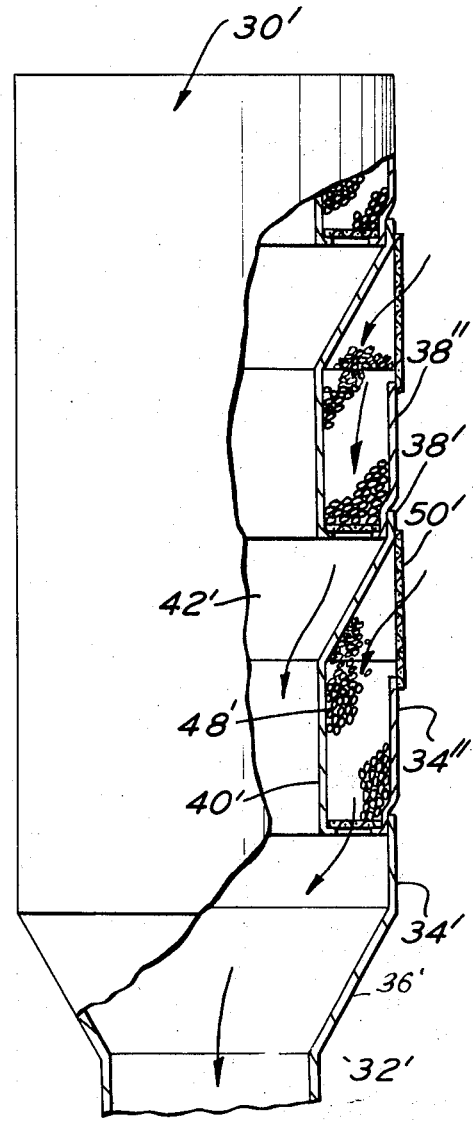
FIG. 5 is a view similar to FIG. 2, but illustrating another embodiment of the present invention particularly adapted for use with sticky materials.

In FIG. 5, there is illustrated a stack in accordance with another embodiment of the present invention designated generally as 30'. Stack 30' is identical with stack 30 except as will be made clear hereinafter. Stack 30' is particularly adapted for use with dirty air containing sticky particles such as hydrated lime, titanium dioxide, iron oxide, etc. In stack 30', corresponding elements are provided with corresponding primed numerals.

In stack 30', the intermediate wall 42' is sloped at an angle of approximate 30' with respect to the longitudinal axis of the stack. Also, the height of the filter bed 48' is above the upper edge of the outer wall of the annular members so that the upper portion of the filter bed 48' overlaps the lower portion of the screen 50'. Each of these features of the stack 30' provides for more efficient cleaning of the filter bed with sticky or gummy materials which tend to form a coating on the filter bed. Thus, even if the sticky material forms a coating across the top of the filter bed 48', the backwash air could still escape through the screen 50'. Stack 30' is otherwise the same as stack 30 and utilized in the same manner.

Figure 6:
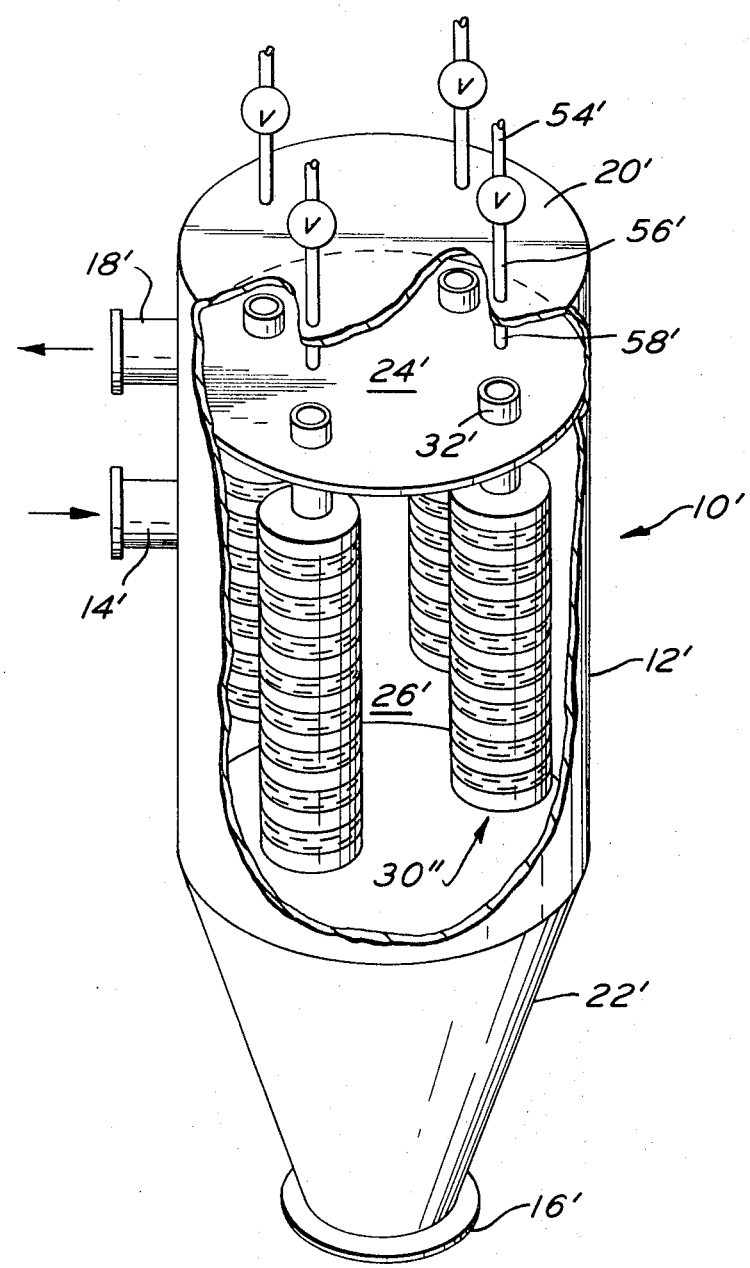
FIG. 6 is a view similar to FIG. 1 but showing another embodiment wherein the stacks are supported from above.

In FIG. 6 there is shown another embodiment designated 10'. Apparatus 10' is identical with apparatus 10 except as set forth hereinafter. In apparatus 10' corresponding elements are identified by corresponding primed numerals. In apparatus 10', the stacks 30'' are below wall 24' and supported therefrom in depending relation. Inlet 14' is radially disposed on housing 12' and is located below outlet 18'. The nozzles 58' are supported by wall 20', each opposite one of the conduits 32'.

If desired, flanges 44 and 46 may be eliminated. This could be accomplished by making walls 34 and 40 integral with a horizontal wall having slots to define a screen which performs the function of screen 52.

The operation of the apparatus 10 is as follows:

The apparatus 10 may be utilized with gas throughput in the range of 10 to 100 CFM/sqft. of filter area. The filter apparatus at said throughput range operates at pressure drops of 2 to 20 inches of water under standard gas conditions and when using No. ½ sand. Controlling porosity by varying the depth of the filter bed and the granular filter medium results in efficiencies as high as 99.9 percent. Particles in the submicron size can be effectively recovered. There are no moving parts, no electrical field, no rotating seals, and no fatigue-prone fibers or membranes, whereby long life may be attained.

Dirty gas enters inlet 14 tangentially at the top of the housing 12 and travls downwardly. The gas passes radially through the outer screens 50 or 50' and then axially through the filter beds. The cleaned gas exits from the air screens and collects in the interior of the stacks for axial discharge to the outlet chamber 28. From chamber 28, the clean gas exits through outlet 18. In this regard, see the collection cycle diagrammatically illustrated in FIG. 3.

When the accumulation of collected particulate causes the pressure drop to reach a specified level, the filter beds may be backwashed. In this regard, see the cleaning cycle diagrammatically illustrated in FIG. 4. Backwashing is preferably obtained without in any way interfering with the continuous inflow of dirty gas and the exiting of clean gas through outlet 18.

Each of the stacks is provided with its own backwash nozzle aligned therewith. Each stack is independently backwashed when needed. Backwashing includes introducing high pressure high velocity air into the stack. If a velocity of 1 foot per second would be sufficient to fluidize the filter bed 48, the backwash air would have a velocity of at least 2 feet per second. The primary backwash air is preferably introduced at 150 to 200 psi in sequential pulses with a short duration between pulses to be certain that the second pulse introduces an air shock wave to the filter bed before the fluidized filter bed has collapsed. A suitable time delay would be in the range of 0.10 to 0.15 seconds on a narrow filter bed of the size referred to hereinafter.

When fluidizing the beds under the conditions set forth above, the granular material will be subjected to the following sequence:

a. the granular material is at rest during the collection cycle,
b. expansion and fluidization of the bed during the first phase of the cleaning cycle and then lift-up of the entire bed until it hits and comes to rest in a non-fluidized state against wall 42 which defines the top wall of the bed with a void between the bed and screen 52,
c. bed falls after first pulse,
d. before the bed comes to rest again as per (a), the second pulse occurs which repeats step (b), and
e. the bed comes to rest as per (a) for further operation with cleaned granular material as per the collection cycle.

When the bed comes to rest after step (e), the granular material upper surface will be at an acute angle less than the angle of repose. Thus, the height of the bed is more uniform and thereby desirable for repeating step (b) during the next cleaning cycle.

During steps (b), (c), and (d), the granular material is cleaned of particles in interstices and of agglomerated particles which may adhere to said granular material. This cleaning would not have been attained if the backwash velocity were merely that which would be necessary for fluidization of the bed and transport of collected particles. I believe the cleaning of particles adhered to the granular material is enhanced by an intergranular rubbing action. Unless particles adhered to the granular material are constantly removed, the height of the bed will increase to a point wherein the space above the bed has decreased so that there is insufficient space for expansion during fluidization of the bed. Thus, the apparatus becomes inoperative due to the high pressure drop.

Successful results have been obtained utilizing a narrow annular filter bed 48. With a stack having its outer diameter of 8 inches and the diameter of the inner walls such as wall 40 being 5 inches, the filter bed 48 had a width in a radial direction of 1 ½ inches. The primary backwash air was a total of 3.7 cubic feet per two pulses. The amount of the induced air in the outlet chamber 28 could be two or more times the volume of the primary air.

In the above-mentioned working embodiment wherein the radial width of the filter bed was 1 ½ inches, the height was 2 ¾ inches. The granular filter material was No. ½ sand having a voidage of 0.42 and a mean particle diameter of 0.019 inches.

For ease of manufacture, the outer wall of each annular member of stacks 30 or 30' may be comprised of two elements joined together. For example, see FIG. 5 wherein wall 34' is hermetically sealed to an offset portion of wall 34'' and wall 38' is similarly joined to wall 38''. The flange for supporting the outer periphery of the bottom screen would be at the bottom edge of walls 34'', 38'', etc. In FIG. 5, it will be noted that wall 36' is sloped like 42'.

The above dimensions and sizes are illustrative. A narrow annular filter bed will generally have dimensions which will result in the outside diameter of the stack being from about five to six times the radial width of the filter bed.

The present invention is useful for removing particles from high temperature gases in the utility, petroleum, steel and special chemical industries. Also, the present invention may be used in an environment wherein the granular material is an adsorber, such as charcoal, for removing particulates and gases such as sulfur dioxide from the dirty stream.

The present invention may be embodied in other specified forms without departing from the spirit or essential attributes thereof and, accordingly, reference should be made to the appended claims, rather than to the foregoing specification as indicating the scope of the invention.

I claim:

1. Filter apparatus comprising a housing having an inlet chamber and an outlet chamber, said housing having a wall separating said chambers, said housing having a dirty gas inlet communicating with the inlet chamber and clean gas outlet communicating with the outlet chamber, a plurality of hollow filter stacks, means in said housing supporting said stacks so that said clean gas outlet communicates with the interior of said stacks while the stacks are disposed in said inlet chamber, each stack including a series of discrete annular members, said annular members including an outer wall connected to an imperforate inner wall by an intermediate wall, said members being superimposed over one another so that the inner and outer walls are generally aligned and coaxial, the inner wall on one member cooperating with an outer wall on another member to define an annular filter bed containing inert granular material, the diameter of said stacks being approximately five to six times the radial width of the filter bed, an inlet screen surrounding the upper end of each filter bed and coaxial therewith to define an inlet from said inlet chamber to the filter bed, a generally horizontal screen across the bottom of each filter bed so that gas to be cleaned may flow axially through the bed and enter the interior of the stack, a discharge conduit at one end of each stack communicating with the interior thereof to facilitate discharge of cleaned gas in an axial direction to said outlet chamber, means for fluidizing the granular material into the space above its bed and radially inwardly from its respective inlet screen by introducing pulses of air into said discharge conduits at a pressure in excess of that required for fluidizing said granular material, and said last-mentioned means including a nozzle aligned with said discharge conduits.

2. Filter apparatus in accordance with claim 1 including a dust outlet from said inlet chamber, said dust outlet extending through said outlet chamber to the exterior of said housing.

3. Filter apparatus in accordance with claim 1 wherein said discharge conduit is the only exit from each stack with the opposite end of the stack being imperforate.

4. Filter apparatus in accordance with claim 1 wherein said intermediate wall is generally parallel to the horizontal screen at the bottom of each filter bed.

5. Apparatus in accordance with claim 1 wherein the inlet screen is a slotted plate.

6. Apparatus in accordance with claim 1 wherein at least some of the intermediate walls are disposed at an acute angle with respect to the longitudinal axis of the stack.

7. Apparatus in accordance with claim 1 wherein the height of the granular material in the filter bed is sufficiently high so that the upper end of the filter bed granular material overlaps the lower end of the inlet screen.

8. Apparatus in accordance with claim 1 wherein at least some of said outer walls have a radially inwardly directed flange for supporting the outer periphery of the screen at the bottom of the filter bed, and at least some of said inner walls having a radially outwardly directed flange for supporting the inner periphery of the screen at the bottom of the bed.

9. Filter apparatus comprising a hollow filter stack, said stack including a series of discrete annular members, each annular member including an imperforate outer wall connected to an imperforate inner wall by an imperforate intermediate wall, said members being superimposed over and connected to one another so that the inner and outer walls are generally aligned and coaxial, the inner wall on one member cooperating with an outer wall on another member to define an annular filter bed containing inert granular material, the outer diameter of the filter beds being about 5–6 times the radial width of the beds, an inlet screen coaxial with the outer wall surrounding the upper end of each filter bed to define an inlet to the filter bed, a screen lying in a radial plane across the bottom of each filter bed between the inner wall on one member and the outer wall on an adjacent member so that gas cleaned by flow through the filter beds in an axial direction may enter the interior of the stack, said screens having openings transversely dimensioned smaller than the transverse dimensions of the granular material, a discharge conduit at one end of the stack communicating with the interior thereof to facilitate discharge of cleaned gas in an axial direction, means for fluidizing the granular material into the space radially inwardly of said inlet screens introducing pulses of high pressure air into said discharge conduit, said means including a nozzle aligned with said discharge conduit.

10. Apparatus in accordance with claim 9 wherein at least some of said outer walls have a radially inwardly directed flange for supporting the outer periphery of the screen at the bottom of the filter bed, and at least some of said inner walls having a radially outwardly directed flange for supporting the inner periphery of the screen at the bottom of the bed.

11. Apparatus in accordance with claim 9 wherein at least some intermediate walls are at an acute angle with respect to the axis of the stack.

12. Apparatus in accordance with claim 9 wherein at least some intermediate walls are generally parallel to the screens at the bottoms of the filter beds.

* * * * *